(12) United States Patent
Gritton et al.

(10) Patent No.: US 9,007,396 B2
(45) Date of Patent: Apr. 14, 2015

(54) METHODS AND SYSTEMS FOR ANALYZING PARTS OF AN ELECTRONIC FILE

(75) Inventors: Charles Gritton, Sterling, VA (US); Daniel Simpkins, Bethesda, MD (US); Tom Morgan, San Mateo, CA (US)

(73) Assignee: Hillcrest Laboratories, Inc., Rockville, MD (US)

( * ) Notice: Subject to any disclaimer, the term of this patent is extended or adjusted under 35 U.S.C. 154(b) by 663 days.

(21) Appl. No.: 13/122,748

(22) PCT Filed: Oct. 8, 2009

(86) PCT No.: PCT/US2009/059975
§ 371 (c)(1),
(2), (4) Date: May 16, 2011

(87) PCT Pub. No.: WO2010/042703
PCT Pub. Date: Apr. 15, 2010

(65) Prior Publication Data
US 2011/0216087 A1    Sep. 8, 2011

Related U.S. Application Data

(60) Provisional application No. 61/104,077, filed on Oct. 9, 2008.

(51) Int. Cl.
*G09G 5/00* (2006.01)
*G06F 3/048* (2013.01)
*G06T 7/00* (2006.01)
*G06F 3/0346* (2013.01)
*G06F 3/0481* (2013.01)

(52) U.S. Cl.
CPC ............ *G06T 7/0083* (2013.01); *G06F 3/0346* (2013.01); *G06F 3/0481* (2013.01); *G06T 2207/20104* (2013.01)

(58) Field of Classification Search
None
See application file for complete search history.

(56) References Cited

U.S. PATENT DOCUMENTS

| | | | |
|---|---|---|---|
| 6,615,408 B1 | 9/2003 | Kaiser et al. | |
| 7,010,751 B2 | 3/2006 | Shneiderman | |
| 7,234,106 B2 | 6/2007 | Simske | |
| 8,136,028 B1 * | 3/2012 | Loeb et al. | 715/205 |
| 2001/0013125 A1 | 8/2001 | Kitsukawa et al. | |
| 2002/0055955 A1 * | 5/2002 | Lloyd-Jones et al. | 707/512 |
| 2003/0229893 A1 | 12/2003 | Sgaraglino | |
| 2004/0049734 A1 | 3/2004 | Simske | |
| 2005/0081239 A1 | 4/2005 | Makowski, Jr. et al. | |
| 2005/0174324 A1 | 8/2005 | Liberty et al. | |
| 2005/0174430 A1 | 8/2005 | Anderson | |

(Continued)

FOREIGN PATENT DOCUMENTS

| | | |
|---|---|---|
| JP | 2005-276178 A | 10/2005 |
| JP | 2001-339698 A | 12/2010 |
| KR | 10-2008-0078217 A | 8/2008 |

OTHER PUBLICATIONS

International Search Report for application No. PCT/US2009/059975, mailed on May 14, 2010.

(Continued)

*Primary Examiner* — Maurice L McDowell, Jr.
*Assistant Examiner* — Donna J Ricks
(74) *Attorney, Agent, or Firm* — Patent Portfolio Builders PLLC

(57) ABSTRACT

Devices, computer readable medium, and methods for selecting an object displayed on a screen and providing information about that object.

19 Claims, 16 Drawing Sheets

(56) References Cited

U.S. PATENT DOCUMENTS

2006/0020905 A1 1/2006 Wroblewski
2006/0130092 A1 6/2006 Makowski, Jr. et al.
2006/0265640 A1 11/2006 Albornoz et al.
2007/0035518 A1 2/2007 Francz et al.
2007/0043748 A1 2/2007 Bhalotia et al.
2007/0078774 A1 4/2007 Brown
2007/0124762 A1 5/2007 Chickering et al.
2008/0098425 A1 4/2008 Welch
2008/0204569 A1 8/2008 Miller et al.

OTHER PUBLICATIONS

Written Opinion of the International Searching Authority for application No. PCT/US2009/059975, mailed on May 14, 2010.

* cited by examiner

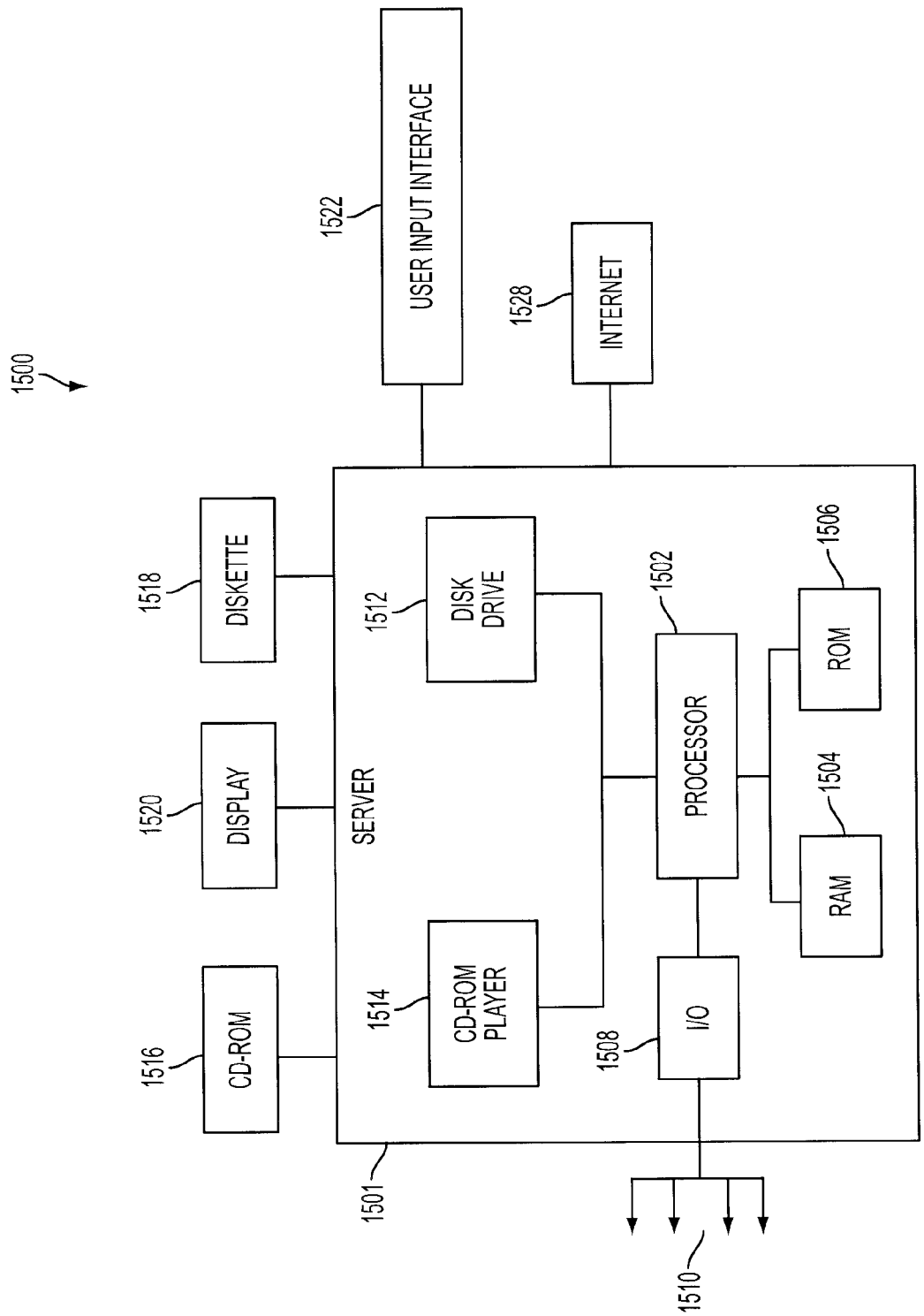

US 9,007,396 B2

METHODS AND SYSTEMS FOR ANALYZING PARTS OF AN ELECTRONIC FILE

RELATED APPLICATION

This application is related to, and claims priority from, U.S. Provisional Patent Application Ser. No. 61/104,077, entitled "Methods and Systems for Analyzing Parts of an Electronic File", filed on Oct. 9, 2008, the disclosure of which is incorporated here by reference.

TECHNICAL FIELD

The present invention generally relates to computing devices, software and methods and, more particularly, to mechanisms and techniques for analyzing at least a part of an electronic file.

BACKGROUND

During the past years, the popularity of digital photography is increasing as digital cameras become more affordable and more powerful, at least in terms of storing images and resolution. Extended databases of digital pictures are created both for personal and commercial purposes. Because of the low cost in generating an image as an electronic file and the convenience of storing this large number of pictures in electronic form, most people and businesses are taking advantage of this digital phenomenon.

However, the large amount of data becomes difficult to manage, organize or index. For example, most of the users would like to be able to tag an image with various pieces of information for remembering different landmarks present in the image or for remembering the names of the persons present in the image. While methods for tagging pictures are available, see for example Lloyd-Jones et al., U.S. Patent Application Publication No. 2002/0055955, Simske, U.S. Patent Application Publication No. 2004/0049734, Anderson, U.S. Patent Application Publication No. 2005/0174430, Bhalotia et al., U.S. Patent Application Publication No. 2007/0043748, and Shneiderman, U.S. Pat. No. 7,010,751, the entire disclosures of which are incorporated here by reference, the existing techniques only allow the user to add predefined boxes at various locations of an image and also allow the user to type a desired text inside the predefined boxes. All of these techniques superimpose the inserted predefined boxes over the existing pictures and save the added data as metadata. Thus, the tagging is achieved by associating an X and Y position on the image with the added data, where the X and Y position on the image is selected by the user with the help of a mouse. In this respect, FIG. 1 shows an image 10 displayed on a screen (not shown). The image includes two persons 12 and 14 and a landmark 16. The user, by using the mouse, moves a cursor 18 from a predefined menu 20 over the image 10, selecting the X and Y position 22 for the placement of a predefined box. The predefined box 24 is selected from the menu 20 and added to the X and Y position 22 as shown in FIG. 2. Then, the user may type desired text inside the box 24.

According to this approach, the user needs to perform the tagging on a computer system that offers the above discussed functionalities. Therefore, the tagging operation is limited to computer systems and is not supported by a TV set. In addition, the tagging operation maps multiple predefined boxes to a single image, which limits the analysis of selected parts of the image.

A user may also want to use the large collection of digital images, for example, to find a same person in different images. In other words, the user may, for example, decide that he wants to determine all the images that include his mother. One alternative is to look through all the images and mark those including his mother. This approach is time consuming and thus, undesired. Another alternative is to add tags, as discussed above, to each picture and to describe within those tags the persons and landmarks present in the pictures. However, this metadata has to be entered prior to searching, which is a challenging task.

In another context, the user may also want to be able to buy products that are displayed on images presented on a TV set or a computing device. These images may incorporate movies, videos, ads, interviews, any kind of information that is presented on a TV set or a computer screen. In this respect, U.S. Patent Application Publication US 2007/0078774, to Brown, the entire content of which is incorporated here by reference, discloses a method and apparatus for the identification of products in a media program and making such products available for consumer purchase.

Brown discloses that dedicated devices BeamBack are interposed between the consumer and the device presenting the media program and also that the content of the media program is a priori linked to product metadata. The scenes of the media program include identifiers that are linked to other identifiers corresponding to still images, including objects presented in the media program. When a consumer is watching the media program, the consumer may press a button on a device to show his interest in objects presented in that particular scene. Based on the correspondence between the identifiers of the media program and the still images, the appropriate still images are shown to the consumer together with the corresponding metadata.

FIG. 3 shows how an image 10 displayed on a screen has selectable predefined regions 26 and 28 that correspond to advertised objects, a purse 26 and a shoe 28 in this example. The consumer may use the mouse to move the cursor 18 over the purse 26 to request more info about the purse. This process is possible because a priori links have been established between the purse 26 and the requested information. In this regard, it is noted that the consumer receives no information about a hat 30 displayed on the image 10 if no prior links have been established between the hat 30 and the corresponding information.

However, according to this approach, the consumer needs a special device and, additionally, both a priori links and product metadata need to be in place before the image is displayed, which might be expensive for the providers of the content and inconvenient for the consumer. Additionally, it may be desirable to provide methods and systems for providing information about displayed items without using menus and/or text boxes, e.g., which enable a user to select an item from a movie without distracting overlays being present.

Accordingly, it would be desirable to provide systems and methods that avoid the above noted limitations of the existing systems.

SUMMARY

According to one exemplary embodiment, there is a method for tagging a part of an image. The method includes providing information for displaying the image on a screen; receiving information related to pointing a pointing device to the part of the image; generating a border around the part of the image, the border corresponding to a movement of the pointing device around the part of the image; generating a predefined enclosure, electronically linked to the border, which is configured to accept text input from a user; and storing border information and predefined enclosure information together with the part of the image such that the part of the image may be analyzed independently of the image.

According to another exemplary embodiment, there is a device for tagging a part of an image. The device includes an output configured to provide information for displaying the image on a screen; an input configured to receive information related to pointing a pointing device to the part of the image; a processor connected to the input and the output and configured to, generate a border around the part of the image, the border corresponding to a movement of the pointing device around the part of the image, and generate a predefined enclosure, electronically linked to the border, which is configured to accept text input from a user; and a memory connected to the processor and configured to store border information and predefined enclosure information together with the part of the image such that the part of the image may be analyzed independently of the image.

According to another exemplary embodiment, there is a computer readable medium for storing computer executable instructions, wherein the instructions, when executed by a processor, cause the processor to perform instructions for tagging a part of an image. The instructions include providing information for displaying the image on a screen; receiving information related to pointing a pointing device to the part of the image; generating a border around the part of the image, the border corresponding to a movement of the pointing device around the part of the image; generating a predefined enclosure, electronically linked to the border, which is configured to accept text input from a user; and storing border information and predefined enclosure information together with the part of the image such that the part of the image may be analyzed independently of the image.

According to another exemplary embodiment, there is a method for identifying a part of an image in a plurality of pictures. The method includes providing information for displaying the image on a screen; receiving information related to pointing a pointing device to the part of the image; generating a border around the part of the image, the border corresponding to a movement of the pointing device around the part of the image; extracting pattern recognition information regarding the part of the image; and storing the pattern recognition information together with the part of the image such that the part of the image may be identified searched for in other pictures.

According to still another exemplary embodiment, there is a device for identifying a part of an image in a plurality of pictures. The device includes an output configured to provide information for displaying the image on a screen; an input configured to receive information related to pointing a pointing device to the part of the image; a processor connected to the input and the output and configured to, generate a border around the part of the image, the border corresponding to a movement of the pointing device around the part of the image, and extract pattern recognition information regarding the part of the image; and a memory connected to the processor and configured to store the pattern recognition information together with the part of the image such that the part of the image may be identified searched for in other pictures.

According to another exemplary embodiment, there is a computer readable medium for storing computer executable instructions, wherein the instructions, when executed by a processor, cause the processor to perform instructions for identifying a part of an image in a plurality of pictures. The instructions include providing information for displaying the image on a screen; receiving information related to pointing a pointing device to the part of the image; generating a border around the part of the image, the border corresponding to a movement of the pointing device around the part of the image; extracting pattern recognition information regarding the part of the image; and storing the pattern recognition information together with the part of the image such that the part of the image may be identified searched for in other pictures.

According to another exemplary embodiment, there is a method for requesting information about an object present in a media file that is displayed on a screen. The method includes receiving information related to pointing a pointing device to the object; generating a border around the circled object, the border corresponding to a movement of the pointing device around the object; collecting border information and location information, wherein the border information identifies a location of the border relative to the object and the location information identifies a location of an image in the media file displayed on the screen and including the object; transmitting the border information and the location information to an external server; and receiving from the external server object information not available in the media file.

According to still another exemplary embodiment, there is a device for requesting information about an object present in a media file that is displayed on a screen. The device includes an input configured to receive information related to pointing a pointing device to the object; a processor connected to the input and configured to, generate a border around the object, the border corresponding to a movement of the pointing device around the object, and collect border information and location information, wherein the border information identifies a location of the border relative to the object and the location information identifies a location of an image in the media file displayed on the screen and including the object; an output connected to the processor and configured to transmit the border information and the location information to an external server; and the input being also configured to receive from the external server object information not available in the media file.

According to still another exemplary embodiment, there is a computer readable medium for storing computer executable instructions, wherein the instructions, when executed by a processor, cause the processor to perform instructions for requesting information about an object present in a media file that is displayed on a screen. The instructions include receiving information related to pointing a pointing device to the object; generating a border around the object, the border corresponding to a movement of the pointing device around the object; collecting border information and location information, wherein the border information identifies a location of the border relative to the object and the location information identifies a location of an image in the media file displayed on the screen and including the object; transmitting the border information and the location information to an external server; and receiving from the external server object information not available in the media file.

According to another exemplary embodiment, there is a method for providing information about an object, displayed on a screen as part of an image of a media file, and inquired about by a user by pointing a pointing device to the object and drawing a border around the object. The method includes receiving border information and location information, the border information identifying a location of the border relative to the object and the location information identifying a location of the image in the media file displayed on the screen and including the object; searching a database for identifying the object based on the border information and the location information; populating the database with object information if the object is not found in the database; retrieving the object information from the database; and providing the object information to the user.

According to another exemplary embodiment, there is a device for providing information about an object, displayed on a screen as part of an image of a media file, and inquired about by a user by pointing a pointing device to the object and drawing a border around the object. The device includes an input configured to receive border information and location information, the border information identifying a location of the border relative to the object and the location information identifying a location of the image in the media file displayed on the screen and including the object; a processor connected to the input and configured to, search a database for identifying the object based on the border information and the location information, populate the database with object information if the object is not found in the database, and retrieve the object information from the database; and an output connected to the processor and configured to provide the object information to the user.

According to still another exemplary embodiment, there is a computer readable medium for storing computer executable instructions, wherein the instructions, when executed by a processor, cause the processor to perform instructions for providing information about an object, displayed on a screen as part of an image of a media file, and inquired about by a user by pointing a pointing device to the object and drawing a border around the object. The instructions include receiving border information and location information, the border information identifying a location of the border relative to the object and the location information identifying a location of the image in the media file displayed on the screen and including the object; searching a database for identifying the object based on the border information and the location information; populating the database with object information if the object is not found in the database; retrieving the object information from the database; and providing the object information to the user.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 15 is a schematic diagram of a device capable of implementing the methods of FIGS. 10 to 13.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a TV set having a graphical user interface. However, the embodiments to be discussed next are not limited to these systems but may be applied to other existing computing systems, such as a computer system, personal digital assistant, mobile phone, etc.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 7A:
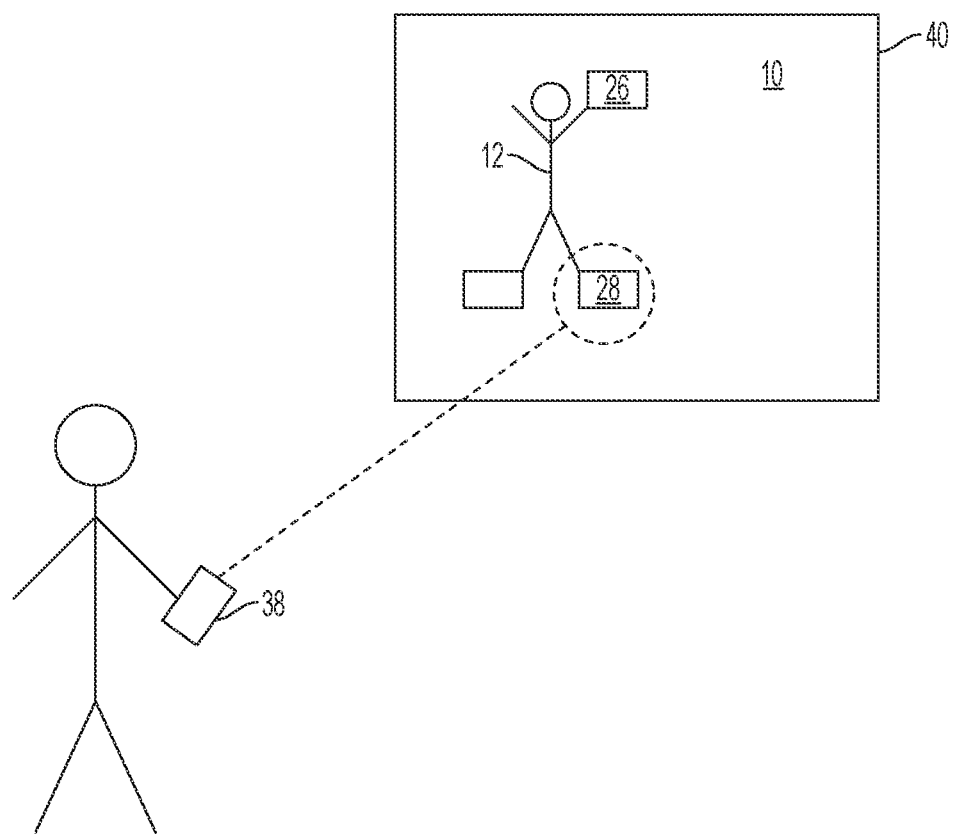
FIG. 7(a) is a schematic diagram illustrating how a user circles an object with the pointing device according to an exemplary embodiment.
Figure 7B:
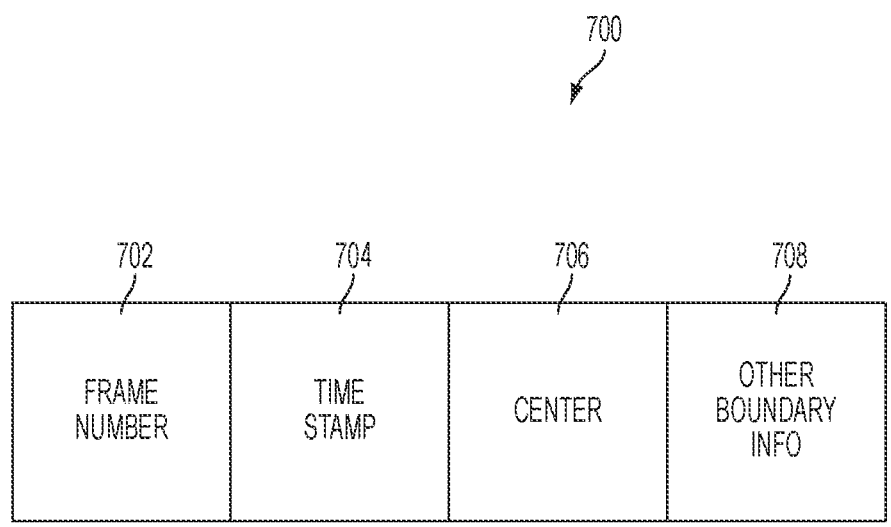
FIG. 7(b) depicts an exemplary signal or data packet for use in transmitting selection information according to an exemplary embodiment.

Although this application contains a number of interesting exemplary embodiments, one embodiment that is of particular interest is described below with respect to FIGS. 7 and 8 wherein a user "selects" a particular item shown as, e.g., part of a program, for example a purse worn by a character in a movie, by drawing a line around that purse using a free space pointing device. According to this exemplary embodiment, a signal is transmitted back from the viewing system, e.g., a television set, set-top box, computer or the like, to a service provider, which signal provides information that identifies the portion of the content which was within the boundary drawn on the screen by the user. The service provider operates on the data in this signal to flag or identify the object selected by the user, e.g., the particular purse worn by the character. This may be done manually, e.g., by an operator, or automatically via an image recognition system. The service provider can then obtain information about the flagged or identified object, e.g., from a database, and send that information down to the viewing system where it can be displayed to the user. Such information can include purchase information, more details about the selected object, etc. If the flagged or identified item has not previously been selected by another user who watched the same content, and if the database does not therefore have further information about the selected item, then the operator may query other data sources, e.g., manufacturer's databases, to obtain such information which may then be used to populate the service provider's local database to satisfy subsequent user queries regarding the same item. In this way, users operate to catalog items associated with content which they are viewing and, therefore, the content does not have to be pre-tagged or cataloged by the service provider or content provider. That is, according to one exemplary embodiment, the decisions regarding which of the many products or items which are shown in, e.g., a movie, for which it is important to tag and be able to provide additional information at a user's request, may be left until later to be decided by the user's themselves.

Figure 1:
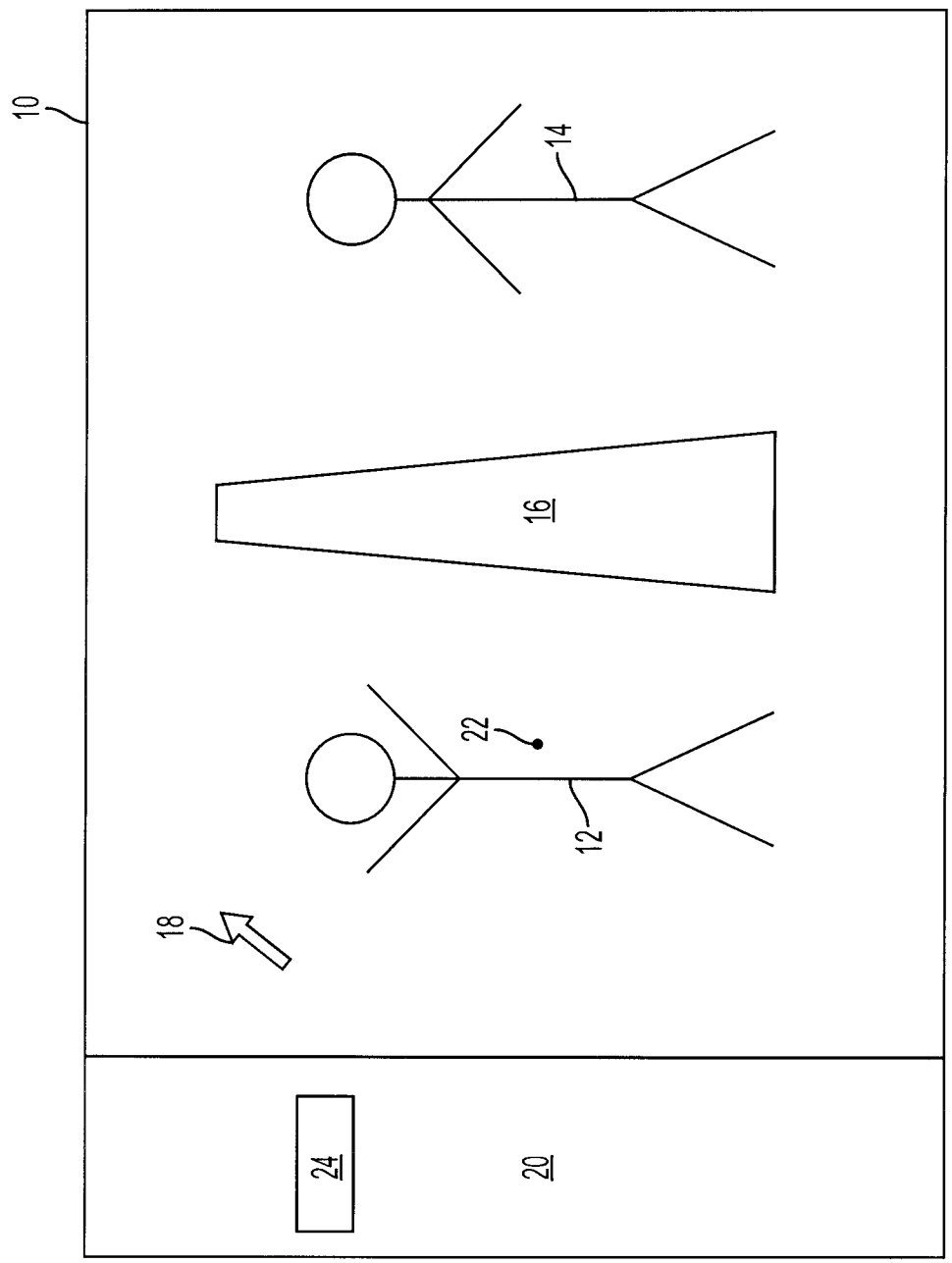
FIG. 1 is a schematic diagram of a screen in which a graphical user interface displays an image and a selectable menu.
Figure 2:
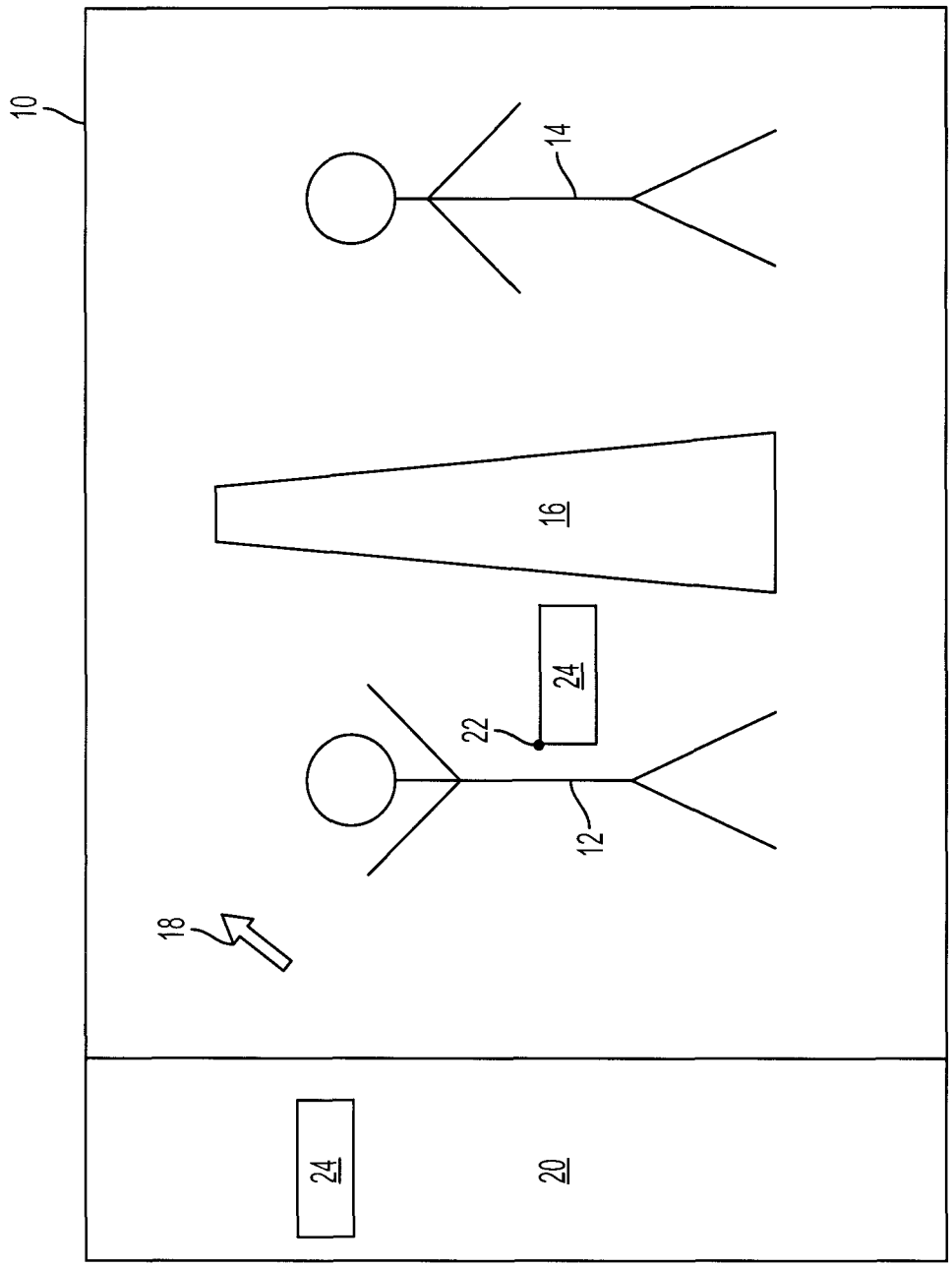
FIG. 2 is a schematic diagram of the screen of FIG. 1 in which a tag has been added to the image.
Figure 3:
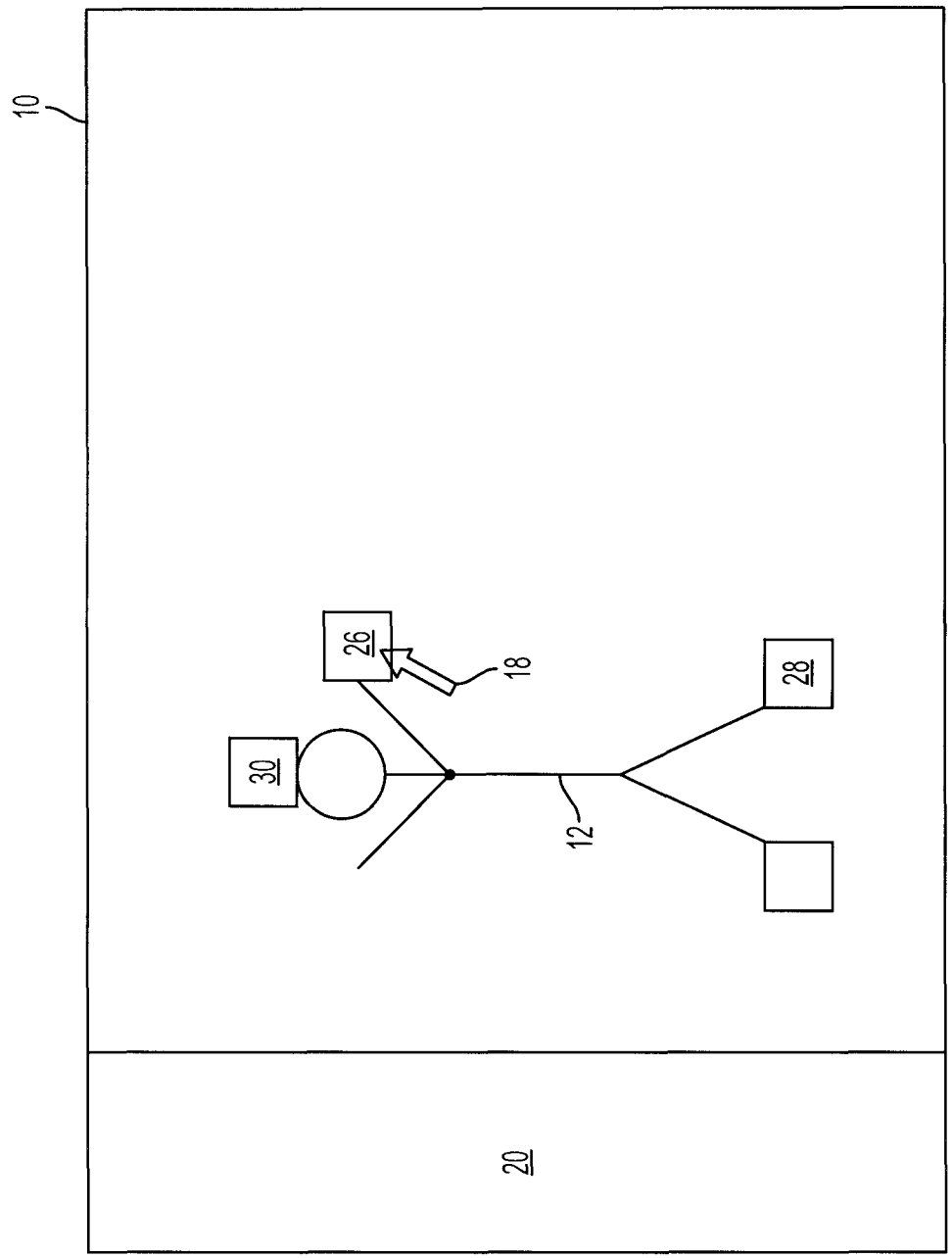
FIG. 3 is a schematic diagram of a screen on which an image has selectable predefined regions.
Figure 4:
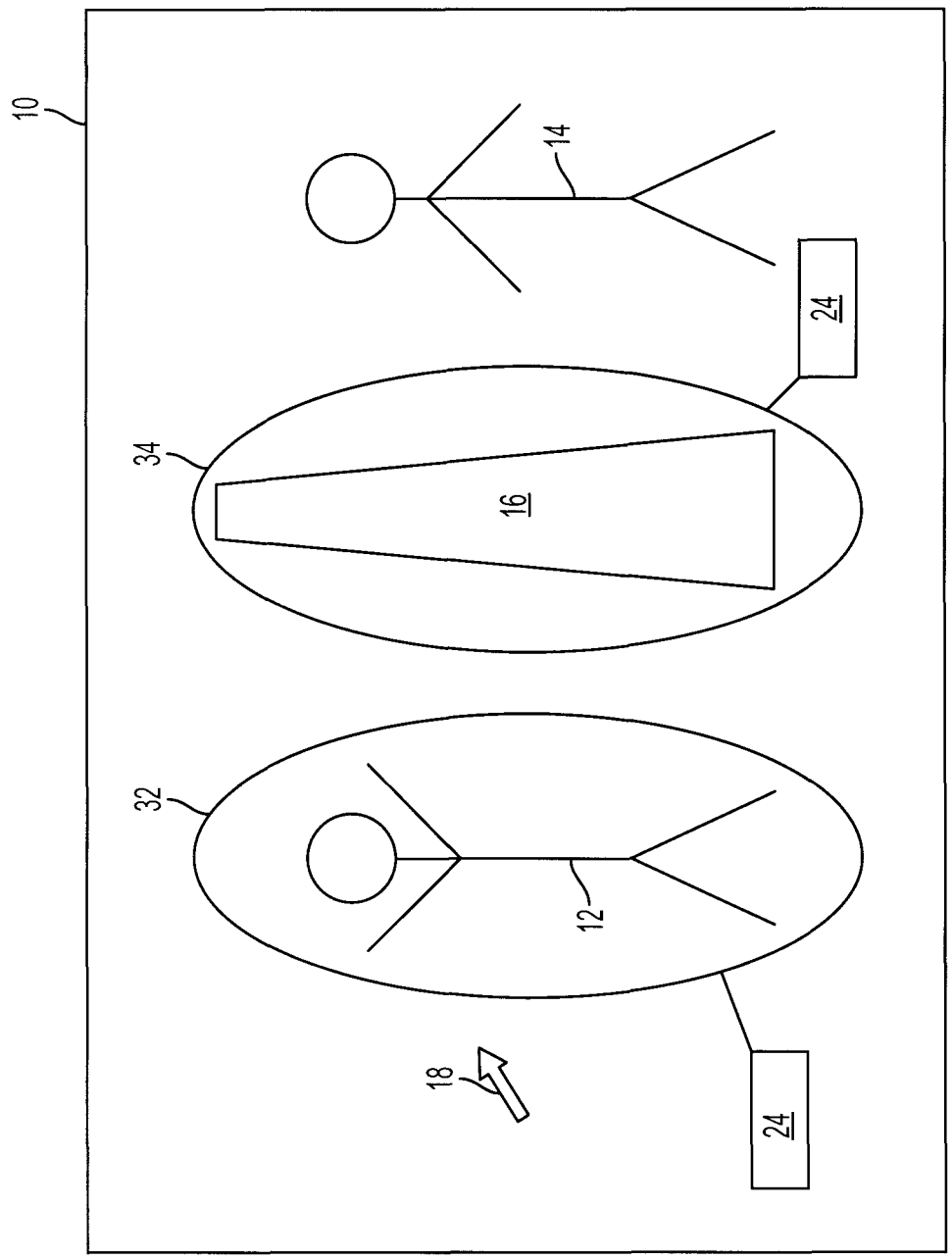
FIG. 4 is a schematic diagram of a screen on which parts of an image are tagged according to an exemplary embodiment.

Beginning first, however, with FIG. 4, according to an exemplary embodiment, an image 10 may be displayed on a display (not shown) of an electronic device. The image may be part of a video, a still picture, etc. The image shows the two persons 12 and 14 and the landmark 16. The user, by using a pointing device, as disclosed for example in Liberty et al., U.S. patent application Ser. No. 10/970,811, and Liberty, U.S. Pat. No. 7,158,118, the entire contents of which are incorporated here by reference, may press a predefined button of the pointing device in order to initiate the tagging process. If the content being displayed on the viewing system or display is dynamic, e.g., a video program, then the pressing of the button (or other any other action which initiates the "tagging" process as described herein) may optionally also have the effect of causing the pointing device to send a signal to the viewing system to automatically pause the displayed content so that the user has more time to draw a boundary around the desired object or objects.

Regardless of whether the displayed content is paused or not, the user may move the pointing device to "circle" any desired part of the image 10, person 12 in this example. As a result of the circling, a border or line 32 is drawn around the selected part 12 of picture 10. It is noted that the meaning of the term "circle" in the exemplary embodiments includes an action of the user of drawing a border around a part of an image (figure, etc.) with the help of a pointing device. The border does not have to completely surround the selected part of the image and also the border does not have to include only the selected object. How to handle the situation when the user draws a border around two objects in the image is discussed later. Further, according to an exemplary embodiment, the user does not have to draw a border that corresponds to a geometric circle as the system can associate a predefined geometric shape (e.g., ellipse, circle, square, rectangle, etc.) to the action of drawing a line around the selected object.

The graphical user interface in the electronic device may be configured, according to an exemplary embodiment, to automatically associate a predefined box 24 with the selected border 32. The shapes of the border 32 and predefined box 24 may be predefined in the graphical user interface or may be selected by the user prior to tagging the image. Text or other electronic data may be added by the user to the inside the predefined box 24. It is noted that the tagging is performed relative to a part of the image 10 and not the entire picture. However, the tagging may be performed relative to the entire picture 10.

According to another exemplary embodiment, the user may select one or more other part(s) 16 of the image 10 and draw another border 34 around the other part 16. The another border 34 may be associated with a corresponding predefined box 24. Thus, a single picture 10 may include one or more parts that are delimited by corresponding borders, each border being associated with a predefined box that may include metadata regarding the selected part.

In an exemplary embodiment presented to clarify the concepts introduced above, assume that a user has a large collection of digital images. As the user develops this digital collection, the user may select people or landmarks of each image, as shown in FIG. 4, and draw borders around the selected people and landmarks. The user may include a description of the landmark or people in the corresponding metadata holder 24. Then, the user may analyze parts of the images of the collection, for example, the user may search for all the images that include his mother given that his mother was selected in each picture and a description of her was introduced in the corresponding metadata holder.

Therefore, according to these exemplary embodiments, an analysis of parts of the images may be performed instead of analyzing the entire picture. In one exemplary embodiment, the selected object may be retrieved from the database based on the description of the object placed in the metadata holder.

Figure 5:
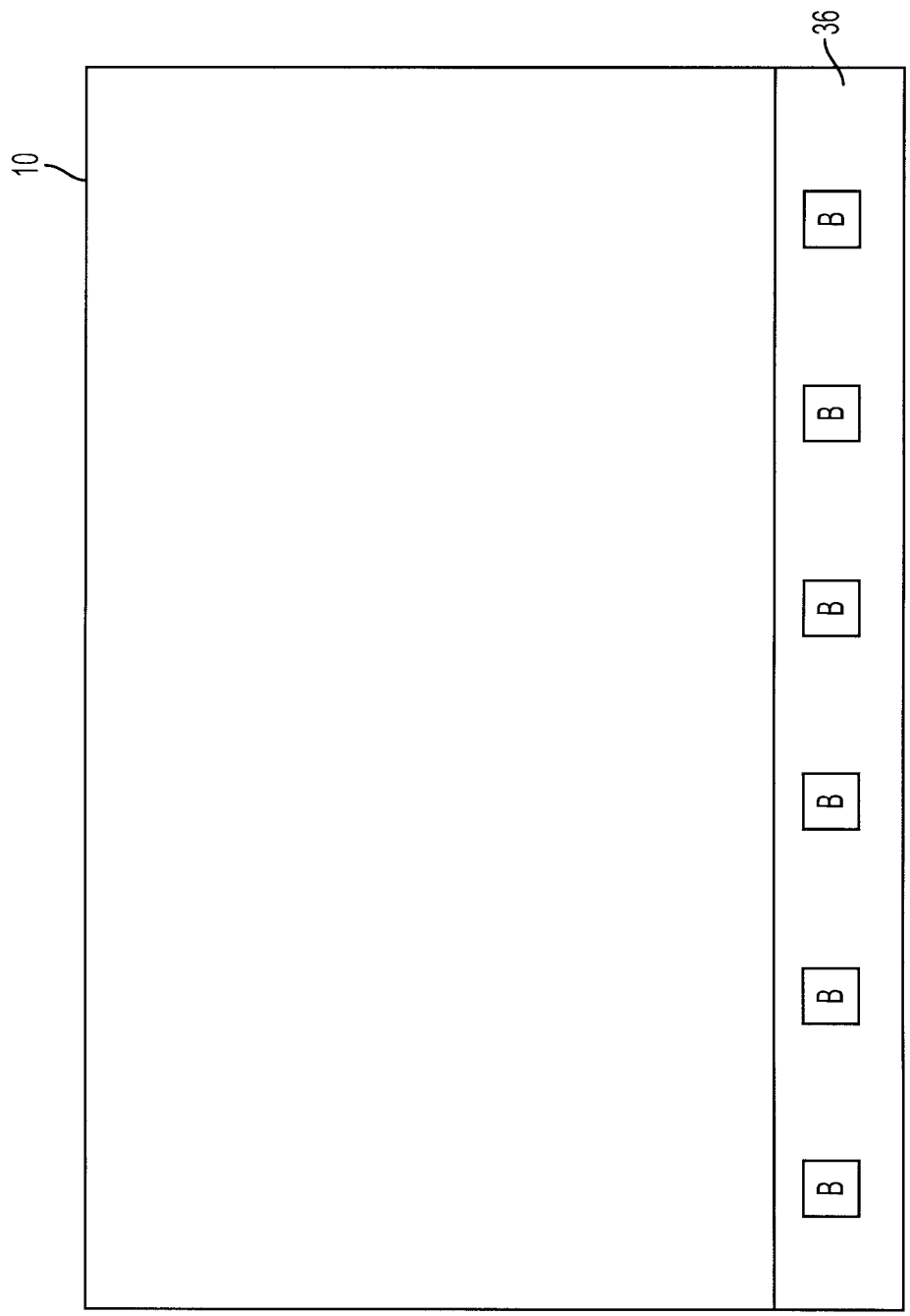
FIG. 5 is a schematic diagram of a user interface according to an exemplary embodiment.

According to another exemplary embodiment, the above discussed tagging may be implemented in a TV set with or without an external device for supporting the tagging operation. The TV set may be configured to interact with the pointing device and the user needs only to move the pointing device around the part to be selected for selecting that part. The initiation of the tagging operation may be performed either by pressing a button on the pointing device or equipping the TV set or top set with a software interface that is displayed on the screen and offers the user the possibility to select various buttons B that are displayed from a selectable menu 36 as shown in FIG. 5. An example of such an interface is disclosed, for example, in U.S. patent application Ser. No. 11/185,220, "GRAPHICAL CURSOR NAVIGATION METHODS", by F. Wroblewski, the entire disclosure of which is incorporated here by reference.

Figure 6:
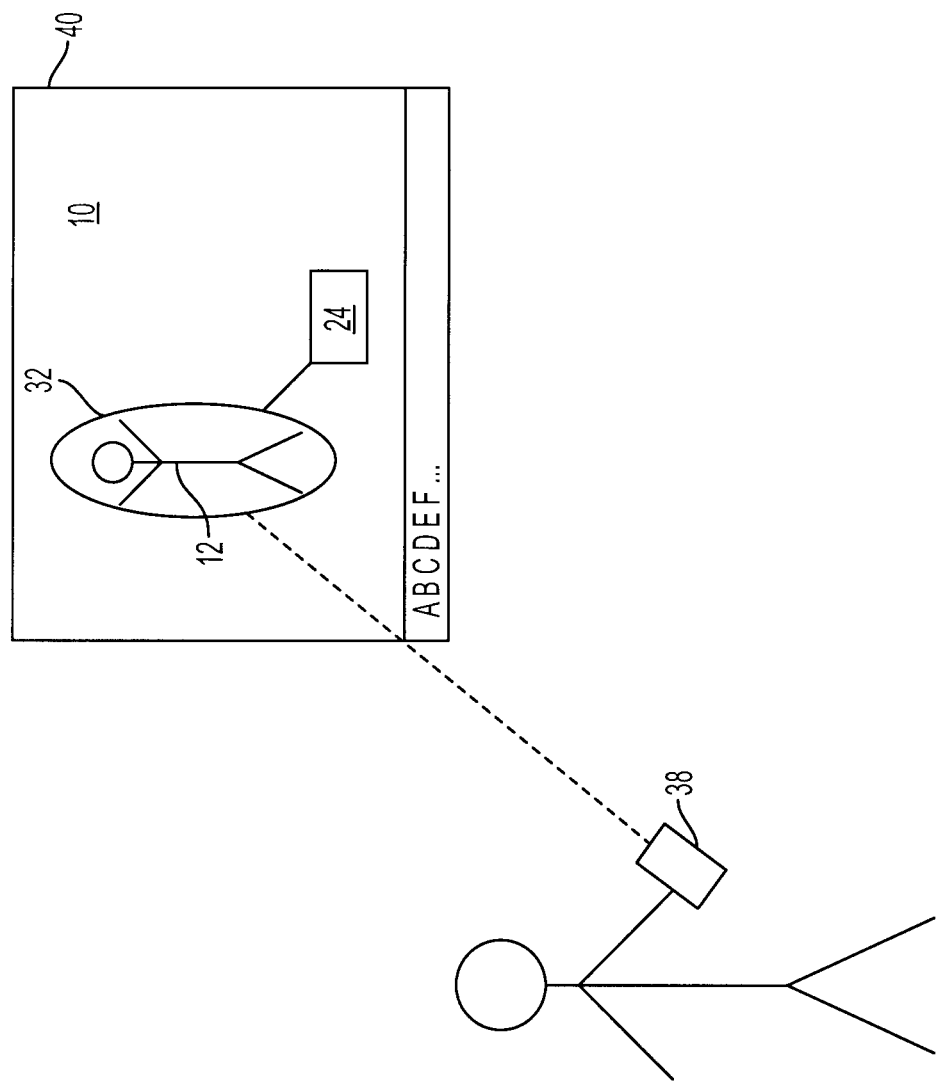
FIG. 6 is a schematic diagram of a pointing device that is used to select an object according to an exemplary embodiment.

According to still another exemplary embodiment, the user may have a 3D pointing device 38 that communicates wirelessly with the TV set 40 as shown in FIG. 6. The user may point the 3D pointing device 38 to the desired object 12 on the screen of the TV set 40 and may draw a contour around that object. The contour becomes the border 32, which has a corresponding metadata holder 24. Thus, according to this embodiment, the user may perform the tagging in the comfort of her chair in front of the TV set without the need of a computer, mouse and complicated software for which the user has to remember various commands. Details about (i) an exemplary free space pointing device that is capable of interacting with the TV set or any other computational devices, and (ii) the interface between the pointing device and the TV set or other computational devices, are disclosed in U.S. patent application Ser. No. 11/480,662 "3D POINTING DEVICES", by Francz et al., the entire contents of which are incorporated herein by reference.

The metadata information may be inserted in the box 24 either via a computer equipped with a keyboard and connected to the TV set or another location where the digital library of pictures is maintained, or directly via the pointing device if the TV set includes an interface that displays letters and numbers on a certain part of the screen. Then, the user simply points the pointing device to the desired letters and numbers and by simply pressing a button when a cursor, corresponding to the pointing device, is over the desired letter, selects the desired letter or number. Other ways to insert text and numbers may be used as would be recognized by those skilled in the art.

According to an exemplary embodiment, the user may insert in the box 24 a link to one or more desired web sites that, for example, may provide more information about the selected object. For example, when a person is selected, the link may take a viewer of the image to a social web site, for example, Facebook®, for providing more information about the selected person.

According to still another exemplary embodiment, a user may use the parts of the image that were selected as described above for another kind of analysis. In this embodiment, after the user has "circled" the desired object, for example, uncle Joe, the user has the option to search one or more of the images of the database for uncle Joe, based not on the metadata that might exist about uncle Joe but based on a similarity of the face of uncle Joe in one picture with his face in another picture. In other words, a pattern matching software may be implemented to analyze the selected object and identify the images in the database that include a selected pattern, in this case the face of uncle Joe. The term object is used in the exemplary embodiments to include not only per se objects but any element or person selected by the user. According to a variant of this exemplary embodiment, the selection of the object by the user does not automatically links a metadata holder to the selected object.

Thus, according to these exemplary embodiments, only parts and not the entire picture are used for the analysis and these parts may be selected by the user. Also, the analysis is not necessarily based on the metadata that might accompany the parts or the image but may be based on the actual pixels of the image. Pattern matching or recognition software are commercially available, for example, FACEIT R software, commercially available from Visionics Corporation of 5600 Rowland Road, Minnetonka, Minn. 55343 U.S.A. and TrueFace software, commercially available from eTrue, Inc. of 144 Turnpike Road, Suite 100, Southboro, Mass. 01772 U.S.A. Other software may be used for performing the pattern recognition.

According to another exemplary embodiment, the concept of circling discussed above may be implemented in a system that allows a user to receive more information about the circled or selected item, e.g., including, but not limited to, information associated with purchasing the selected item. More specifically, as shown in FIG. 7(*a*), a user may select with the pointing device 38 a desired object 26 or 28 that is shown on an image 10 on the TV set 40. The TV set may be replaced with any electronic device that is capable of displaying any image and the image may be part of a video, TV show, or advertisement that is run on the screen 40.

It is noted that the desired objects 26 or 28, in this purely illustrative example a purse and a shoe worn by the actor 12 while acting in a movie, need not be pre-tagged or pre-linked to any metadata prior to making the movie available for display to end users via a content distribution system, e.g., VOD, etc., connected to their televisions or other output devices. Also, there is no need according to this embodiment to provide selection areas on the screen 40, which correspond to the desired objects 26 and 28, such that a user may select the objects. In this embodiment, the user simply points the pointing device 38 to a desired object 28, draws a border along the desired object 28, and the TV set or other computing device generates a signal that includes an indicator or data which enables a service provider to determine which part of the screen has been selected by the user. For example, the indicator may include at least one of a frame indicator, program indicator, time indicator and information regarding the position of the boundary relative to the image 10. The actual pixels that were circled by the user do not have to be known. The television, set-top box, computer or the like may, for example, transmit a signal or data packet 700 such as that shown in FIG. 7(*b*) which includes a frame number 702 associated with the video frame in which the object was circled, a time stamp 704, a center point 706 within the bounded area created by the user's drawing of the boundary line, and optionally one or more other parameters 708 which define the bounded area (e.g., a radius value for a circular area, major/minor axes for an elliptical area, length/width values for a rectangular or square area, etc.). It will be appreciated that the data format illustrated in FIG. 7(*b*) is purely illustrative and that, for example, a subset of the illustrated data elements could be transmitted in signal 700 or additional elements could be added.

This information is then transmitted to a call center or service provider, potentially via the same medium that provides the image to the TV set. According to another exemplary embodiment, the information may be sent to the call center via a different path than the path via which the image is received by the TV set. The term "TV set" is used in these exemplary embodiments for simplicity but one skilled in the art would know that other electronic devices that have a screen may as well be used. The call center may retrieve more information about the object circled by the user and provide the user with that additional information.

Figure 8:
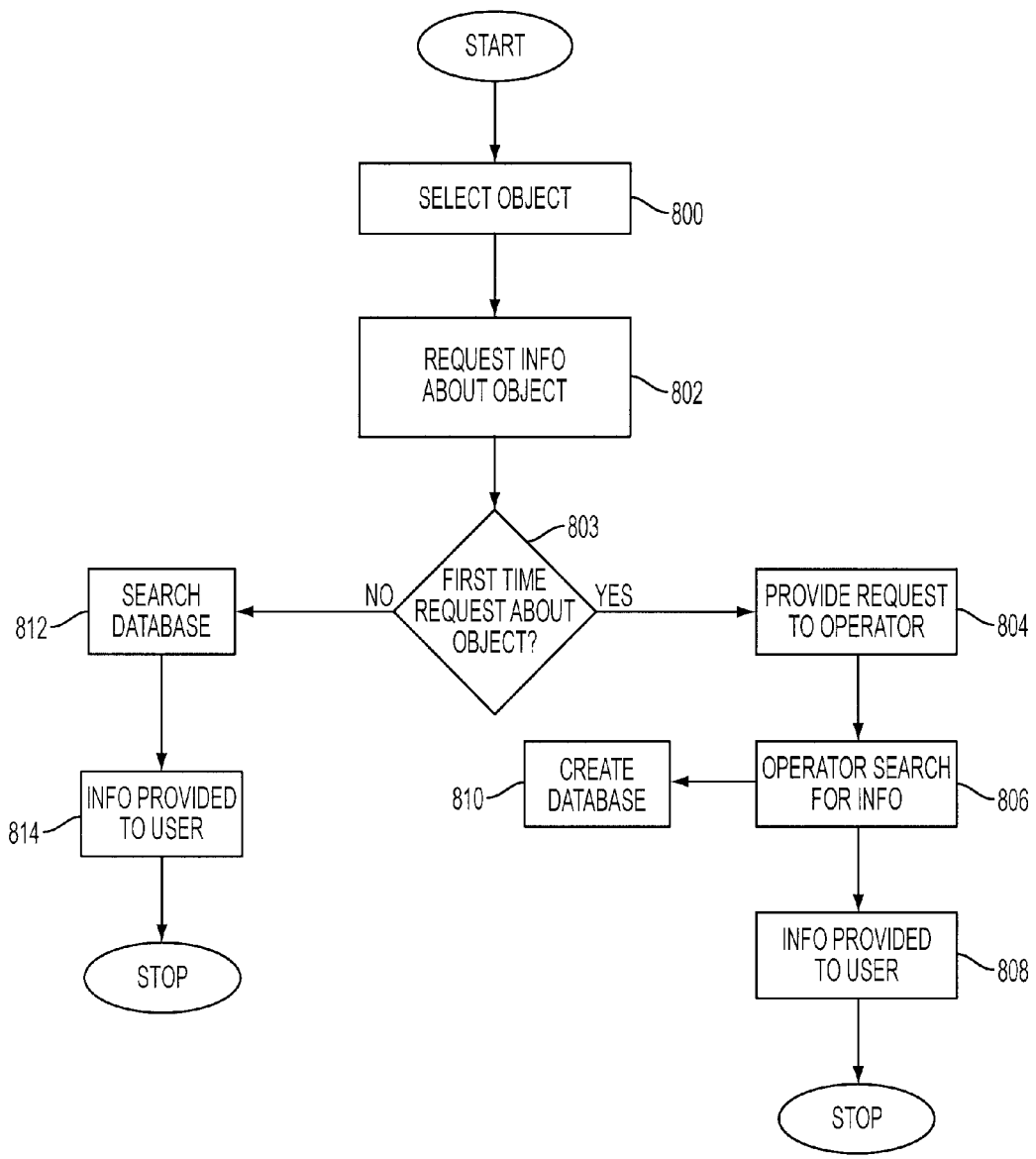
FIG. 8 illustrates the steps of a method for providing information about a selected object according to an exemplary embodiment.

The steps involved in this exchange of information are discussed in more detail with regard to the embodiment shown in FIG. 8. According to this exemplary embodiment a user, while watching a screen of a TV set, may see, for example, during a movie, an actress wearing an attractive new purse. If the user wants to receive more information about the purse, e.g., brand name, price, size, where to buy from, the user may point the pointing device, e.g., remote control of the TV set, towards the screen and circle the purse during step 800. According to an exemplary embodiment, the user may press a specific button of the pointing device while circling the purse, which initiates the "bordering" action. After the user releases the button, information regarding the circled object, e.g., frame information, scene information, time information and the position of the border relative to the screen, is sent to the call center. These actions are illustrated in step 802 under the generic name of a user requesting information. Other ways for the user to send this information to the call center may be used, as for example, providing a selectable menu on the TV screen in response to pressing a certain button on the pointing device. Then, using one or more of the techniques described above in Wroblewski, the user may activate the buttons of the displayed menu to initiate the circling action, without the need to press a button on the pointing device.

The information regarding the location of the purse on the screen together with the information identifying the scene and/or frame are sent by the TV set (or top box or other device used by the user to receive the movie) to the call center. At the call center, there may be two mechanisms for processing the request from the user. According to one exemplary embodiment, wherein no a priori processing of the objects desired by the users has been implemented prior to releasing the movie or other content for distribution to the end users, initially there is no information linked to the purse selected by the user.

Thus, a representative of the call center receives the request from the user in step 803 and, based on the received location information of the scene or the frame in which the purse appeared in the movie, the representative can retrieve that scene or frame on his own screen. The representative from the call center has access to all media objects that are presented on the user's screen. After determining the scene or frame of the movie, based in part on the border information, the representative determines the object that the user is interested in, in this case the purse. Then, the representative decides whether the selected purse has been previously researched or not at this point in time, e.g., by another representative from the call center handling another user's request for additional information for that particular item (potentially from the same frame in the same movie, another frame in the same movie, or another piece of content altogether).

Step 803 may also be performed by a computing device. If no user has requested information about the purse, then the process advances to step 804, in which the request is provided to the same or another representative and then to step 806, in which the representative performs the research about the purse. The representative may have a table stored on his computing device that associates each object used in the movie with a corresponding web site of the manufacturer of the object. By looking up the table for the desired object, the representative is presented with the link to the desired web page or other resource. The manufacturer or the operator of the call center may package in advance the required information pertinent to the selected object so that the representative easily retrieves this information with a click of a button from a database.

Because this is the first time a user has requested information about this object, i.e., the purse, the representative may add in step 810, to the database, a link between the purse, the scene or frame information related to the purse and the manufacturer information about the purse so that the next request about the purse may be processed more expeditiously. In this way, the database is generated based on the interaction between the users and the representatives of the call center. According to an exemplary embodiment, this process may be implemented in a computing system to automatically perform the search and linking. The representative then provides the manufacturer information to the user in step 808. This information may be displayed on the screen of the TV or may be provided as an email to the TV or another device of the user, or may be provided as a voice message to the user. The representative may also present additional information to the user, as for example, promotional information regarding related products of the same manufacturer, ratings of the selected product, places where to buy the selected product, etc.

However, if in step 803 has been determined that the purse has already been inquired about by other users, then the representative searches in step 812 the existent database created in step 810 and, as discussed above, provides the appropriate information to the user in step 814. This information is provided to the user more quickly because the representative does not have to collect and assemble the information about the purse as this information was already generated in step 810.

One advantage of one or more of the exemplary embodiments discussed above is that no a priori processing of the movie is necessary, i.e., the operator of the call center or the owner of the movie does not have to identify all the selectable objects in the movie based on guess work. According to one or more of the embodiments, the users are selecting any desired object and together with the representatives of the call center build up a database that include the desired products. Although the user requesting information about a product that is not in the database may experience some delay, because the representative needs to collect live the information about the required product, the subsequent users do not face this problem. An incentive for the users to be the first to request information about a product may be added by providing a reduction in the purchase price or other reward, e.g., a monetary reward.

The concept of circling an object on a screen and various challenges associated with this action are discussed next. If the image displayed on the screen is static or the objects shown in the image move slowly in time, the user has enough time to circle a desired object with the help of the pointing device to generate the border. However, if the desired object moves relatively quickly on the screen, e.g., a character wearing the purse runs in the movie, it might be difficult for the user to correctly circle the purse. Thus, according to an exemplary embodiment, the pointing device or the graphical user interface may be configured to present optional buttons to the user for slowing down the frames presented on the screen or for actually freezing a desired frame, so that the user has enough time to perform the circling. An example of such a feature is implemented, for example, by Tivo (2160 Gold Street, Alviso, Calif., 95002).

Figure 9:
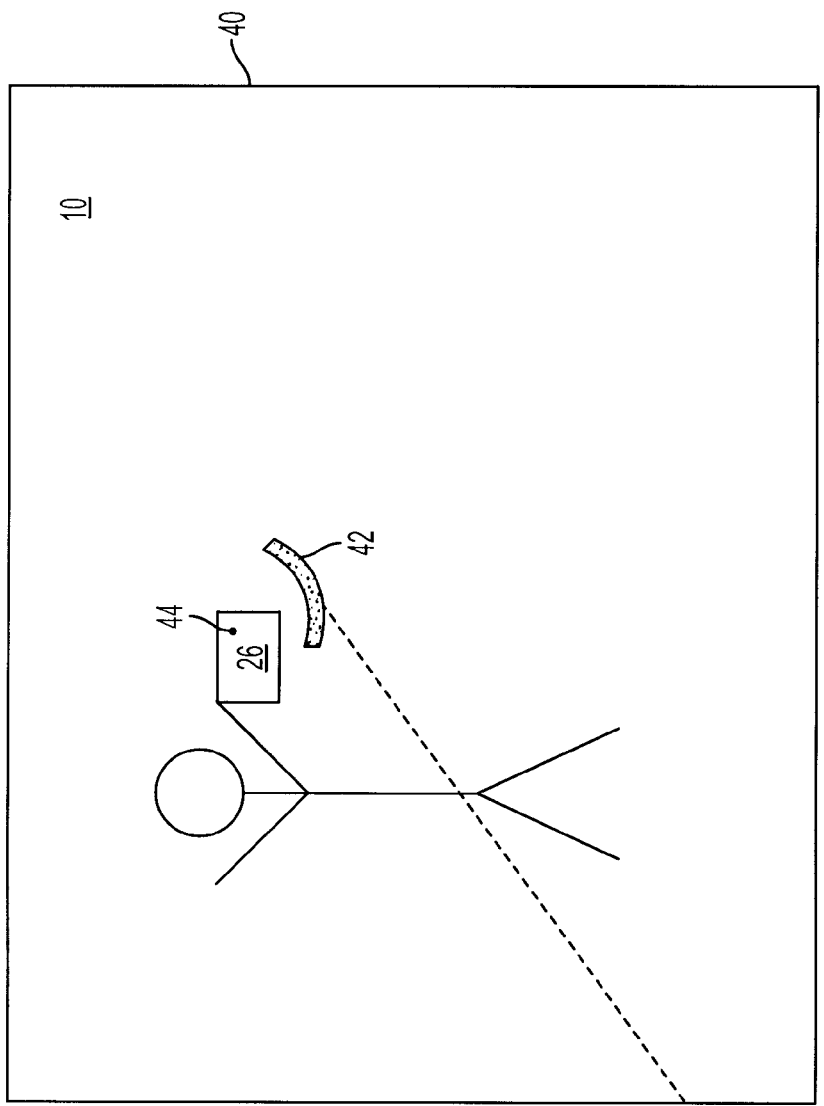
FIG. 9 is a schematic diagram illustrating how a user may circle part of the object with the pointing device according to an exemplary embodiment.
Figure 10:
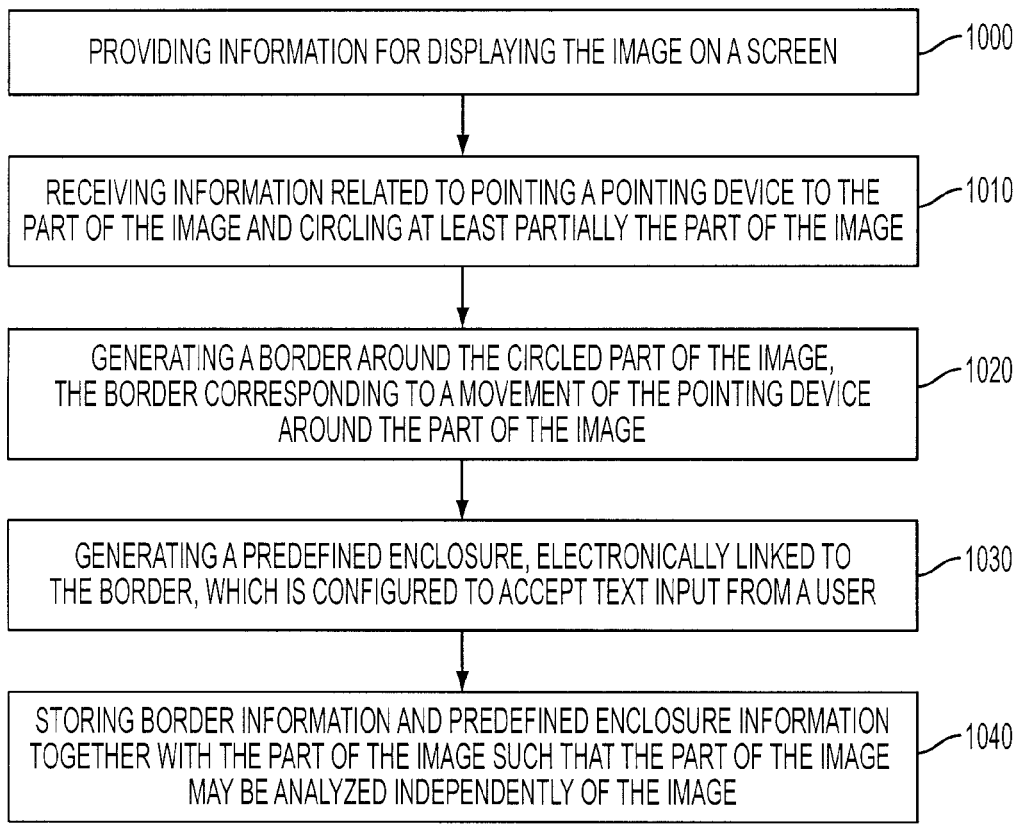
FIG. 10 is a flow chart illustrating steps of a method for tagging a part of an image according to an exemplary embodiment.

According to another exemplary embodiment, the user does not have to completely circle the desired object but only needs to draw a portion of the border, enough to delineate the desired object. In this respect, FIG. 9 shows the portion 42 of the border that is enough for indicating the purse. If the portion of the border or the entire border appear to be ambiguous, i.e., two possible objects are included within the border, the representative or a computing device at the call center informs the user that two or more objects have been selected, presents the user with a list of the potentially selected objects and the user may select which specific object was intended to be selected.

Still according to another exemplary embodiment, the border information may include the position of one or more pixels 44, as shown in FIG. 9, that were pointed by the user with the pointing device. If the pointed pixel 44 is inside the purse, the representative or the computing device at the call center may still identify in the selected frame the purse. Thus, according to this exemplary embodiment, the user does not need to slow down or freeze the displayed picture for selecting the desired object. The user needs only to place, for an instant, the cursor corresponding to the pointing device on the object and depress a button for tagging the desired object. Using for example the tagging mechanism discussed in the previous exemplary embodiments, the TV set of the user may be configured to add in the metadata holder (predefined box) the information related to the frame and/or scene of the selected object and at least the X and Y position of the pixels 44 (if not the entire border information), to be transmitted to the call center.

A set of methods are discussed next with regard to practicing the various embodiments discussed above.

According to an exemplary embodiment, the steps of a method for tagging a part of an image. The method includes a step 1000 of providing information for displaying the image on a screen, a step 1010 of receiving information related to pointing a pointing device to the part of the image and circling at least partially the part of the image, a step 1020 of generating a border around the circled part of the image, the border corresponding to a movement of the pointing device around the part of the image, a step 1030 of generating a predefined enclosure, electronically linked to the border, which is configured to accept text input from a user, and a step 1040 of storing border information and predefined enclosure information together with the part of the image such that the part of the image may be analyzed independently of the image.

Figure 11:
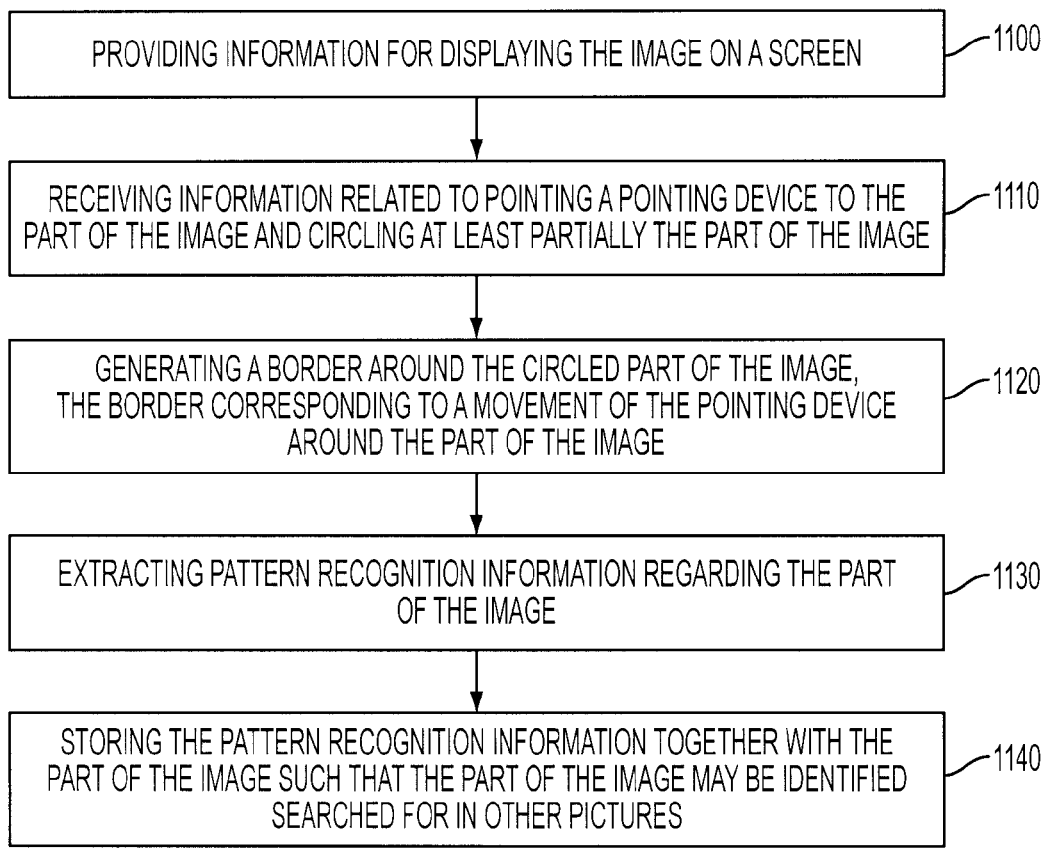
FIG. 11 is a flow chart illustrating steps of a method for identifying a part of an image in another images according to an exemplary embodiment.

According to another exemplary embodiment, the steps of a method for identifying a part of an image in a plurality of pictures are illustrated in FIG. 11. The method includes a step 1100 of providing information for displaying the image on a screen, a step 1110 of receiving information related to pointing a pointing device to the part of the image and circling at least partially the part of the image, a step 1120 of generating a border around the circled part of the image, the border corresponding to a movement of the pointing device around the part of the image, a step 1130 of extracting pattern recognition information regarding the part of the image, and a step 1140 of storing the pattern recognition information together with the part of the image such that the part of the image may be identified searched for in other pictures.

Figure 12:
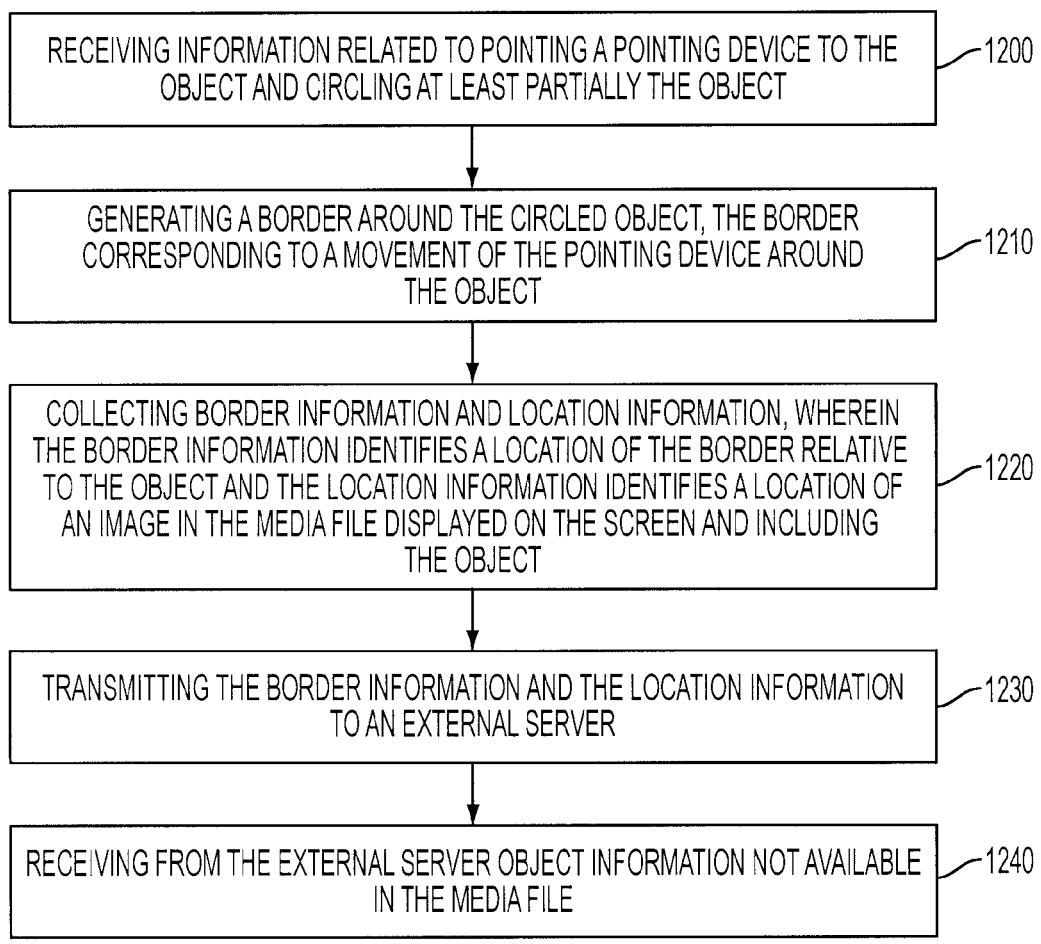
FIG. 12 is a flow chart illustrating steps of a method for requesting information about a part of an image according to an exemplary embodiment.

According to another exemplary embodiment, the steps of a method for requesting information about an object present in a media file that is displayed on a screen, are illustrated in FIG. 12. The method includes a step 1200 of receiving information related to pointing a pointing device to the object and circling at least partially the object, a step 1210 of generating a border around the circled object, the border corresponding to a movement of the pointing device around the object, a step 1220 of collecting border information and location information, wherein the border information identifies a location of the border relative to the object and the location information identifies a location of an image in the media file displayed on the screen and including the object, a step 1230 of transmitting the border information and the location information to an external server, and a step 1240 of receiving from the external server object information not available in the media file.

Figure 13:
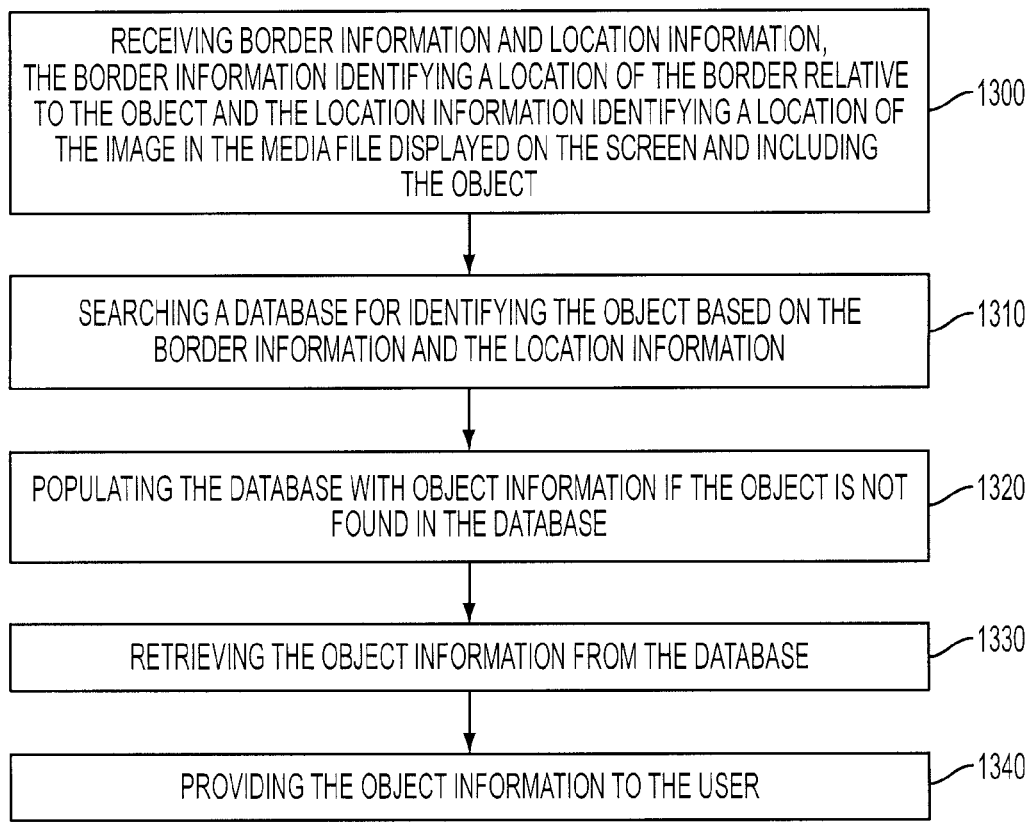
FIG. 13 is a flow chart illustrating steps of a method for providing information about an object, displayed on a screen as part of an image of a media file according to an exemplary embodiment.

According to another exemplary embodiment, there is a method, illustrated in FIG. 13, for providing information about an object, displayed on a screen as part of an image of a media file, and inquired about by a user by pointing a pointing device to the object and drawing a border around the object. The method includes a step 1300 of receiving border information and location information, the border information identifying a location of the border relative to the object and the location information identifying a location of the image in the media file displayed on the screen and including the object, a step 1310 of searching a database for identifying the object based on the border information and the location information, a step 1320 of populating the database with object information if the object is not found in the database, a step 1330 of retrieving the object information from the database, and a step 1340 of providing the object information to the user.

Thus, according to one or more of the exemplary embodiments, a method for analyzing or searching or buying an object that is part of a media file and it is displayed on a screen is streamlined and made easier for the user by providing a pointing device that describes the moves of the user in a three-dimensional space. The user has the advantage of pointing the pointing device to the screen of the device that he is watching, circling (partially or totally) a desired object shown on the screen and identifying, searching and/or buying that object. Also, another advantage of one or more of the exemplary embodiments is that the producers of the media file do not have to a priori load information about objects present in the media file that the user may desire. The process is in fact performed a posteriori, after the media file is displayed on a screen.

Figure 14:
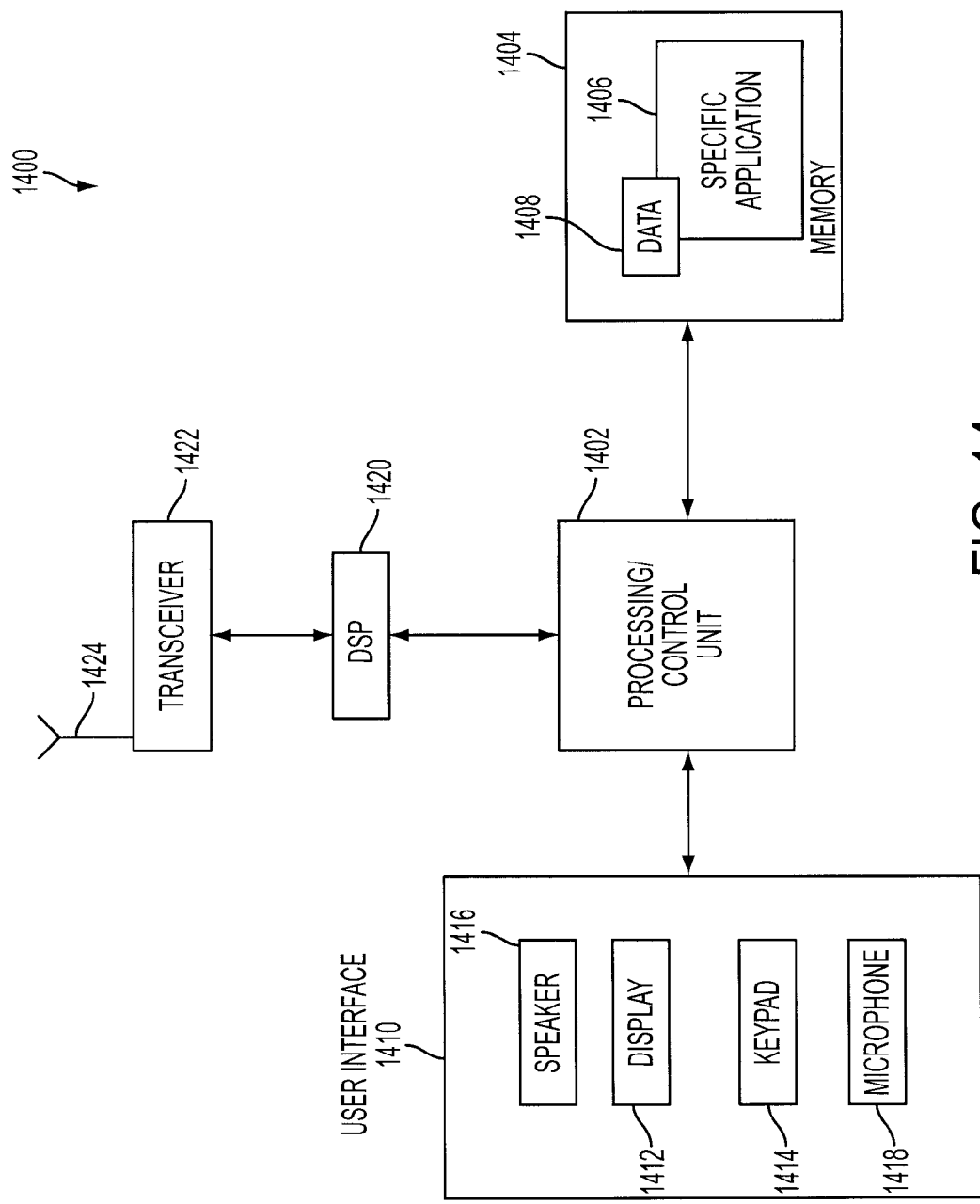
FIG. 14 is a schematic diagram of a pointing device according to an exemplary embodiment.

For purposes of illustration and not of limitation, an example of a representative three pointing device capable of carrying out operations in accordance with the exemplary embodiments is illustrated in FIG. 14. It should be recognized, however, that the principles of the present exemplary embodiments are equally applicable to standard pointing devices. For example, the pointing device may be a mobile phone, a TV remote control, etc.

The exemplary pointing device 1400 may include a processing/control unit 1402, such as a microprocessor, reduced instruction set computer (RISC), or other central processing module. The processing unit 1402 need not be a single device, and may include one or more processors. For example, the processing unit 1402 may include a master processor and associated slave processors coupled to communicate with the master processor.

The processing unit 1402 may control the basic functions of the mobile terminal as dictated by programs available in the storage/memory 1404. Thus, the processing unit 1402 may execute the functions described in FIGS. 10 to 13. More particularly, the storage/memory 1404 may include an operating system and program modules for carrying out functions and applications on the pointing device. For example, the program storage may include one or more of read-only memory (ROM), flash ROM, programmable and/or erasable ROM, random access memory (RAM), subscriber interface module (SIM), wireless interface module (WIM), smart card, or other removable memory device, etc. The program modules and associated features may also be transmitted to the pointing device 1400 via data signals, such as being downloaded electronically via a network, such as the Internet.

One of the programs that may be stored in the storage/memory 1404 is a specific program 1406. As previously described, the specific program 1406 may interact with a server (call center) to retrieve object information. The object information may include at least one of object price information, object specification information, a name of the manufacturer of the object, a name of an outlet where to buy from the object, a web address of a site that sells the object, and a one click button for buying the object by using the pointing device. The program 1406 and associated features may be implemented in software and/or firmware operable by way of the processor 1402. The program storage/memory 1404 may also be used to store data 1408, such as the object information, or other data associated with the present exemplary embodiments. In one exemplary embodiment, the programs 1406 and data 1408 are stored in non-volatile electrically-erasable, programmable ROM (EEPROM), flash ROM, etc. so that the information is not lost upon power down of the pointing device 1400.

The processor 1402 may also be coupled to user interface 1410 elements associated with the pointing device. The user interface 1410 of the pointing device may include, for example, a display 1412 such as a liquid crystal display, a keypad 1414, speaker 1416, and a microphone 1418. These and other user interface components are coupled to the processor 1402 as is known in the art. The keypad 1414 may include alpha-numeric keys for performing a variety of functions, including dialing numbers and executing operations assigned to one or more keys. Alternatively, other user interface mechanisms may be employed, such as voice commands, switches, touch pad/screen, graphical user interface using a pointing device, trackball, joystick, or any other user interface mechanism.

The pointing device 1400 may also include a digital signal processor (DSP) 1420. The DSP 1420 may perform a variety of functions, including analog-to-digital (A/D) conversion, digital-to-analog (D/A) conversion, speech coding/decoding, encryption/decryption, error detection and correction, bit stream translation, filtering, etc. The transceiver 1422, generally coupled to an antenna 1424, may transmit and receive the radio signals associated with a wireless device.

The pointing device 1400 of FIG. 14 is provided as a representative example of a computing environment in which the principles of the present exemplary embodiments may be applied. From the description provided herein, those skilled in the art will appreciate that the present invention is equally applicable in a variety of other currently known and future mobile and fixed computing environments. For example, the specific application 1406 and associated features, and data 1408, may be stored in a variety of manners, may be operable on a variety of processing devices, and may be operable in mobile devices having additional, fewer, or different supporting circuitry and user interface mechanisms. It is noted that the principles of the present exemplary embodiments are equally applicable to non-mobile terminals, i.e., landline computing systems.

The external server or other systems for providing object information in connection with the present exemplary embodiments may be any type of computing device capable of processing and communicating object information. An example of a representative server arrangement capable of carrying out operations in accordance with the servers of the exemplary embodiments is illustrated in FIG. 15. The structure shown in FIG. 15 may also be used in a TV set, set top box, etc. Hardware, firmware, software or a combination thereof may be used to perform the various steps and operations described herein. The server arrangement 1500 of FIG. 5 is an example computing structure that may be used in connection with such a system.

The server arrangement 1500 suitable for performing the activities described in the exemplary embodiments may include a server 1501. Such a server 1501 may include a central processor (CPU) 1502 coupled to a random access memory (RAM) 1504 and to a read-only memory (ROM) 1506. The ROM 1506 may also be other types of storage media to store programs, such as programmable ROM (PROM), erasable PROM (EPROM), etc. The processor 1502 may communicate with other internal and external components through input/output (I/O) circuitry 1508 and bussing 1510, to provide control signals and the like. The processor 1502 carries out a variety of functions as is known in the art, as dictated by software and/or firmware instructions.

The server 1501 may also include one or more data storage devices, including hard and floppy disk drives 1512, CD-ROM drives 1514, and other hardware capable of reading and/or storing information such as DVD, etc. In one embodiment, software for carrying out the above discussed steps may be stored and distributed on a CD-ROM 1516, diskette 1518 or other form of media capable of portably storing information. These storage media may be inserted into, and read by, devices such as the CD-ROM drive 1514, the disk drive 1512, etc. The server 1501 may be coupled to a display 1520, which may be any type of known display or presentation screen, such as LCD displays, plasma display, cathode ray tubes (CRT), etc. A user input interface 1522 is provided, including one or more user interface mechanisms such as a mouse, keyboard, microphone, touch pad, touch screen, voice-recognition system, etc.

The server 1501 may be coupled to other computing devices, such as the landline and/or pointing device, via a network. The server may be part of a larger network configuration as in a global area network (GAN) such as the Internet 1528, which allows ultimate connection to the various landline and/or mobile client devices.

The disclosed exemplary embodiments provide a pointing device, a server, a system, a method and a computer program product for selecting various objects displayed on a screen. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

As also will be appreciated by one skilled in the art, the exemplary embodiments may be embodied in a wireless device, a network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer readable medium may be utilized including hard disks, CD-ROMs, digital versatile disc (DVD), optical storage devices, or magnetic storage devices such a floppy disk or magnetic tape. Other non-limiting examples of computer readable media include flash-type memories or other known memories.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a general purpose computer or a processor.

What is claimed is:

1. A method for tagging a part of a dynamically displayed image, the method comprising the following steps in the order named:
   providing information for displaying the dynamically displayed image on a screen;
   receiving information about a partial circling related to pointing a pointing device to the part of the dynamically displayed image;
   generating a portion of a border partially around the part of the dynamically displayed image, the portion of the border corresponding to a movement of the pointing device around the part of the dynamically displayed image;
   generating a predefined enclosure, electronically linked to the portion of the border, which is configured to accept text input from a user; and
   storing border information and predefined enclosure information together with the part of the dynamically displayed image such that the part of the dynamically displayed image may be analyzed independently of the dynamically displayed image.

2. The method of claim 1, further comprising:
   generating plural borders and predefined enclosures in response to selections of plural parts of the dynamically displayed image.

3. The method of claim 1, wherein the predefined enclosure information does not include pixels corresponding to the selected part of the dynamically displayed image.

4. The method of claim 1, wherein the receiving step comprises:

receiving a position of at least one pixel of the part of the dynamically displayed image that was pointed by the pointing device.

5. The method of claim 1, wherein the receiving step comprises:
receiving information about a complete circling of the part of the dynamically displayed image.

6. The method of claim 1, wherein the generating a border comprises:
generating the border completely around the part of the dynamically displayed image.

7. A device for tagging a part of a dynamically displayed image, the device comprising:
an output configured to first provide information for displaying the dynamically displayed image on a screen;
an input configured to then receive information about a partial circling related to pointing a pointing device to the part of the dynamically displayed image;
a processor connected to the input and the output and configured to,
generate a portion of a border partially around the part of the dynamically displayed image, the portion of the border corresponding to a movement of the pointing device around the part of the dynamically displayed image, and then
generate a predefined enclosure, electronically linked to the portion of the border, which is configured to accept text input from a user; and
a memory connected to the processor and configured to thereafter store border information and predefined enclosure information together with the part of the dynamically displayed image such that the part of the dynamically displayed image may be analyzed independently of the dynamically displayed image.

8. The device of claim 7, wherein the processor is further configured to generate plural borders and predefined enclosures in response to selections of plural parts of the dynamically displayed image.

9. The device of claim 7, wherein the predefined enclosure information does not include pixels corresponding to the selected part of the dynamically displayed image.

10. The device of claim 7, wherein the processor is further configured to receive a position of at least one pixel of the part of the dynamically displayed image that was pointed by the pointing device.

11. The device of claim 7, wherein the processor is further configured to receive information about a complete circling of the part of the dynamically displayed image.

12. The device of claim 7, wherein the processor is further configured to generate the border completely around the part of the dynamically displayed image.

13. The device of claim 7, wherein the input receives information from the pointing device and the output sends information to the screen.

14. A non-transitory computer readable medium for storing computer executable instructions for tagging a part of a dynamically displayed image, wherein the instructions, when executed by a processor, cause the processor to perform the following steps in the order named:
providing information for displaying the dynamically displayed image on a screen;
receiving information about a partial circling related to pointing a pointing device to the part of the dynamically displayed image;
generating a portion of a border partially around the part of the dynamically displayed image, the portion of the border corresponding to a movement of the pointing device around the part of the dynamically displayed image;
generating a predefined enclosure, electronically linked to the portion of the border, which is configured to accept text input from a user; and
storing border information and predefined enclosure information together with the part of the dynamically displayed image such that the part of the dynamically displayed image may be analyzed independently of the dynamically displayed image.

15. The medium of claim 14, further comprising:
generating plural borders and predefined enclosures in response to selections of plural parts of the dynamically displayed image.

16. The medium of claim 14, wherein the predefined enclosure information does not include pixels corresponding to the selected part of the dynamically displayed image.

17. The medium of claim 14, wherein the receiving step comprises:
receiving a position of at least one pixel of the part of the dynamically displayed image that was pointed by the pointing device.

18. The medium of claim 14, wherein the receiving step comprises:
receiving information about a complete circling of the part of the dynamically displayed image.

19. The medium of claim 14, wherein the generating a border comprises:
generating the border completely around the part of the dynamically displayed image.

* * * * *